(12) United States Patent
Müller

(10) Patent No.: US 6,615,540 B1
(45) Date of Patent: Sep. 9, 2003

(54) PLANTER COMPRISING A SUPPORT

(76) Inventor: Siegfried Müller, Zum Hämeler Wald 6, D-31275 Lehrte (DE)

( * ) Notice: Subject to any disclaimer, the term of this patent is extended or adjusted under 35 U.S.C. 154(b) by 0 days.

(21) Appl. No.: 10/031,257

(22) PCT Filed: Apr. 20, 2000

(86) PCT No.: PCT/DE00/01256
§ 371 (c)(1),
(2), (4) Date: Oct. 23, 2001

(87) PCT Pub. No.: WO00/64239
PCT Pub. Date: Nov. 2, 2000

(30) Foreign Application Priority Data

Apr. 23, 1999 (DE) .................................... 199 18 418

(51) Int. Cl.$^7$ ................................................ A01G 9/02
(52) U.S. Cl. .............................................. 47/68; 248/201
(58) Field of Search .................... 47/68, 67, 41.14; 248/201, 202.1, 292.14, 294.1, 310

(56) References Cited

U.S. PATENT DOCUMENTS

| | | | | |
|---|---|---|---|---|
| 1,574,227 A | * | 2/1926 | Andersen | 248/292.14 |
| 2,193,272 A | * | 3/1940 | Crossley | 248/292.14 |
| 2,477,509 A | * | 7/1949 | Burgesser | 211/88.03 |
| 3,347,504 A | * | 10/1967 | Gross | 248/201 |
| 3,946,522 A | * | 3/1976 | Schifman | 47/40 |

FOREIGN PATENT DOCUMENTS

| | | | | |
|---|---|---|---|---|
| DE | 3726728 A1 | * | 2/1989 | ............ A01G/9/02 |
| EP | 0 334 770 | | 9/1989 | |
| EP | 344770 A1 | * | 12/1989 | ............ A61B/5/05 |
| EP | 0 846 413 | | 6/1998 | |
| EP | 846413 A2 | * | 6/1998 | .......... A01G/27/04 |
| GB | 2 154 858 | | 9/1985 | |

* cited by examiner

Primary Examiner—Charles T. Jordan
Assistant Examiner—Susan C. Alimento
(74) Attorney, Agent, or Firm—Collard & Roe, P.C.

(57) ABSTRACT

The invention relates to a planter comprising a plant container which opens upward and which has a bottom and sidewalls, as well as comprising an insert for insertion into the plant container. The insert is comprised of a basket which opens upward and which is provided for accommodating a plant culture, whereby the basket has a bottom and sidewalls. The planter additionally comprises a support which can be attached with an end thereof to the planter and can be attached with another end thereof to a fastening location. The planter is characterized in that the support consists of two retaining arms which can be attached to two opposing sidewalls of the planter, whereby each retaining arm can be fixed with a lower area thereof to an inner wall of a sidewall. The lower area of the retaining arm is provided with at least two holes in which the bolts mounted on the inner wall engage. When engaged, the retaining arm is laterally fixed to the bolts through the inner wall of the sidewall of the plant container and through an outer wall of a sidewall of the basket. An upper area of the retaining arm rises above the plant container and the basket and is provided with a fastening flange for fixing to the fastening location. The angle between the fastening flange and the fastening location can be adjusted when the planter is in a horizontal position.

16 Claims, 7 Drawing Sheets

PLANTER COMPRISING A SUPPORT

CROSS REFERENCE TO RELATED APPLICATIONS

Applicant claims priority under 35 U.S.C. §119 of German Application No. 199 18 418.6 filed Apr. 23, 1999. Applicant also claims priority under 35 U.S.C. §120 of PCT/DE00/01256 filed Apr. 20, 2000. The international application under PCT article 21(2) was not published in English.

BACKGROUND OF THE INVENTION

1. Field of the Invention

The invention relates to a planter having an insert for holding a plant and having a support for attaching the planter to a fastening location.

The invention relates to a planter in accordance with the preamble of claim 1.

2. The Prior Art

A planter of such kind, having a plant container which opens upward, into which an insert in the form of a basket is inserted, wherein the planter has a support that can be attached at one end to the planter and at the other end to a fastening location, is known from EP 0 846 413 A2. The planter has proved highly serviceable, especially when used as a balcony flowerbox firstly since the water regimen for the plants can be regulated extremely precisely by virtue of the special configuration of the this planter, and secondly since the removable basket-shaped insert allows plants to be taken out of the upwardly open plant container easily if necessary, for wintering, for instance, without the need to dismantle the entire planter from the attachment location, for example a balcony railing or similar.

However, the support that has been hitherto used for this planter is associated with a number of disadvantages. The support described in EP 0 846 413 A2 is provided with a suspension hook having one upwardly bent end which engages in a hole in the bottom of the plant container. The suspension hook thus encompasses the bottom and one sidewall of the planter, so that the planter, when hanging up, is resting on the suspension hook. At its other end, which is also shaped, the hook is attached for example to the head of a balcony railing. A suspension hook of this nature is largely indistinguishable from the suspension hooks commonly used for planters. All such suspension hooks have certain disadvantages.

In particular, the suspension arrangement may not provide sufficient stability. In inclement weather, the planter can be blown back and forth by sidewinds, which in extreme cases may cause the planter to become detached from the support and fall. A further disadvantage lies in the fact that it is difficult or impossible to adjust conventional supports to the angle of the suspension location. In addition, the end of the support provided for attachment to the suspension location is mostly available in a single, standard conformation, corresponding to standard balcony railing heads.

Moreover, if the known planters are attached to the balconies of multi-story buildings as flowerboxes, the supports that are attached to the bottom area of the planters do not look attractive to the observer at street level, since they detract from the overall appearance of planters of such kind, particularly when the supports, which are manufactured for the most part from steel, begin to show signs of corrosion.

If the known planters are positioned or suspended more at less on a level with the ground in public facilities, it is also necessary to ensure that they are adequately protected against theft. The conventional supports are unsatisfactory in this respect, because it is difficult to conform in them in a way that makes them impossible to steal.

SUMMARY OF THE INVENTION

The task of the invention is therefore to improve a planter of the kind described in the introduction, to the end that its support is conformed to be mechanically stable, secure against severe weather and theft and such that the overall visual impression of the planter is not impaired.

This task in solved by a planter provided with a support that consists of two retaining arms which can be attached to two opposing sidewalls of the planter, whereby each retaining arm is furnished with at least two holes in the lower area thereof, with which bolts mounted on the inner wall engage, wherein the engaged retaining arm is laterally fixed to the bolts through the inner wall of the sidewall of the planter and through an outer wall of a sidewall of the basket, and an upper area of the retaining arm rises above the plant container and the basket and is provided with a fastening flange for fixing to the fastening location, wherein the angle between fastening flange and fastening location can be adjusted when the planter is in a horizontal position.

The task is therefore solved remarkably easily in that two retaining arms are fastened to the inner sides of the plant container sidewalls, and that the angle between the retaining arm or fastening flange and the fastening location is adjustable.

A configuration of this kind provides for mechanically stable fastening of the planter to the fastening location, and mechanical stable attachment of the support to the planter. Since the support is laterally restricted and constrained by the sidewalls of the plant container and the basket respectively, even laterally occurring mechanical forces, for example from wind, can be effectively neutralized. The solution according to the invention also offers advantages with respect to the danger of theft. Since the retaining arms are secured internally, unauthorized persons cannot easily gain access to the attachment locations of the retaining arms to the planter, since these attachment locations are covered by the basket; it is easily possible to secure the basket to the plant container, so that this basket cannot be removed from the plant container without considerable effort.

Since only a small portion of the support is visible, the support no longer detracts from the appearance. When the planter is viewed from below or diagonally below, the support is entirely unseen. The support is integrated with the overall appearance and is organically assimilated thereinto, so that it does not have the visual effect of an external attachment.

Since the angle between the support and the attachment location is infinitely adjustable, the planter according to the invention can also be attached to sites that hitherto presented problems of attachment, for example vertically under a building overhang, a filling station roof or similar.

Practical embodiments of the invention provides that both bolts are arranged on the sidewall of the planter on a line parallel to the surface of the bottom wall of the basket; a plurality of holes is arranged in an arc pattern in the lower area of the retaining arm, wherein one bolt can be engaged with any hole in the arc and a second bolt can be engaged in a hole that is located outside of the arc, and the linear separation between each hole of the arc and the hole located outside the arc is the same in every case.

To secure the lower area of the retaining arm in this embodiment, the single hole is positioned over a bolt. This bolt then serves as an axis about which the retaining arm is pivoted to the desired angle until the hole in the arc corresponding to the desired angle can be located over the second bolt.

A further practical embodiment of the invention provides for the configuration of the retaining arm as a flat member, in which an upper end forming the fastening flange is conformed angularly. It is further provided that the fastening flange is furnished with an elongated hole. This elongated hole can then particularly be used for screwing the fastening flange directly to the attachment location, in which case the elongated hole serves to align the planter. For example, if the planter is to be attached to the railing head of a balcony, standard parts can be used to provide an attachment of the fastening flange to the railing head over these standard parts, or, for example a simple perforated strap can be wrapped round the railing head and attached to the fastening flange by means of a toggle.

Improved embodiments of the invention provide that the bolt has the form of a single-piece ratchet that is attached to the inner wall of the plant container by means of a sprung tongue, or in alternative embodiments thereof, the bolt is made from plastic and is injected into the inner wall, or the bolt is springily located in the sidewall. Alternative embodiments may also provide for a bolt having the form of a stud.

A further embodiment may provided for a hole in the retaining arm to have the shape of a curved elongated hole. In conjunction with a stud furnished with a nut, this curved elongated hole may be used to provide the simplest method possible for infinite adjustability of the retaining arm.

Further practical embodiments of the invention provide for a fastening flange having at least one folding point so that at least one partial area of the fastening flange can be angularly adjusted more precisely; that the fastening flange is furnished with a slot; that the retaining arm can be attached to a support bracket, wherein the support bracket can be angled member which may be bent to form a U-member, wherein it may be further provided that the angled member has at least one folding point, by means of which the angled member may be bent to form a U-member, and wherein it may be further provided for the angled member to have a toggle at one end, wherein the toggle can be attached to the fastening flange.

BRIEF DESCRIPTION OF THE DRAWINGS

Other advantages and configuration of the inventions are explained in the detailed description, the claims and the drawing. The drawing shows:

DETAILED DESCRIPTION OF THE PREFERRED EMBODIMENT

Figure 1:
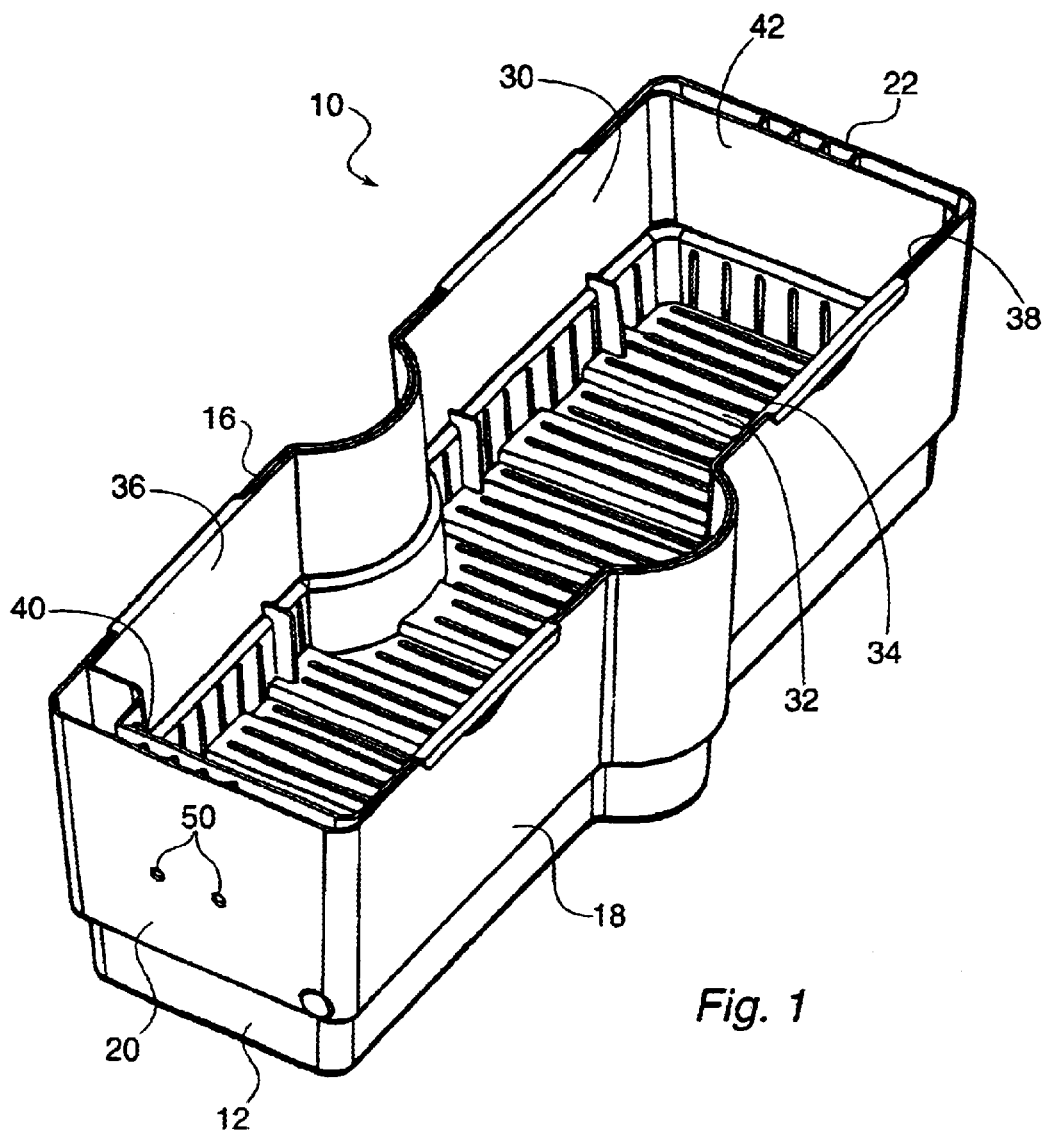
Figure 2:
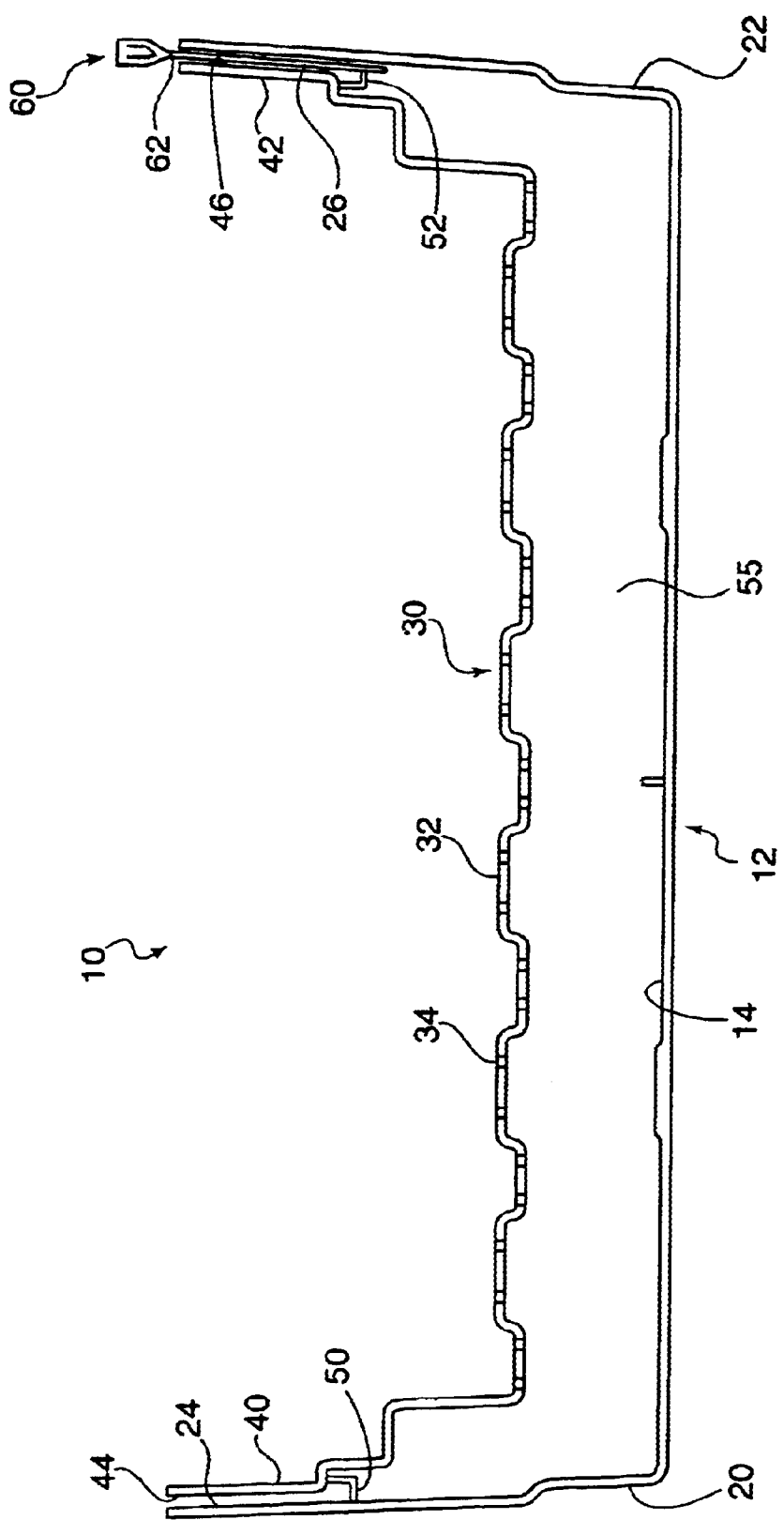
Figure 3:
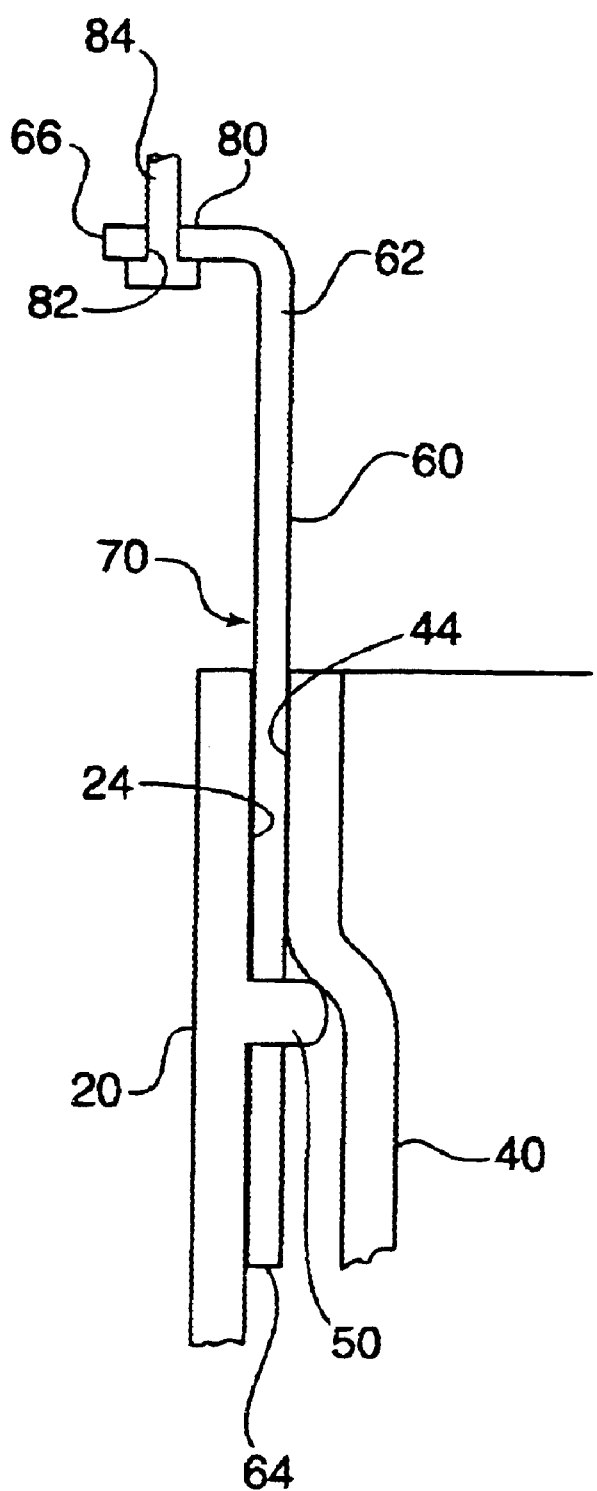
Figure 4:
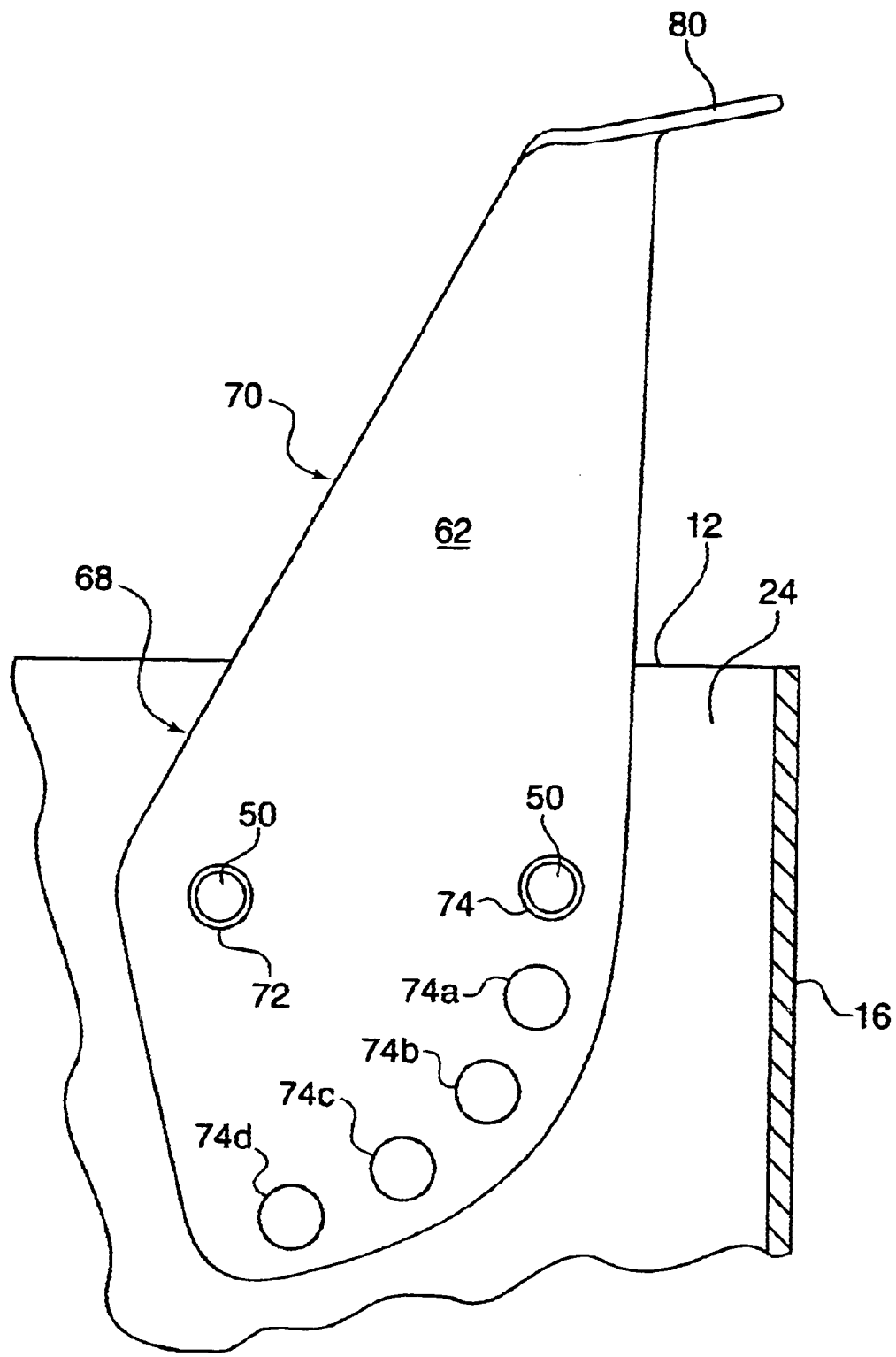
Figure 5:
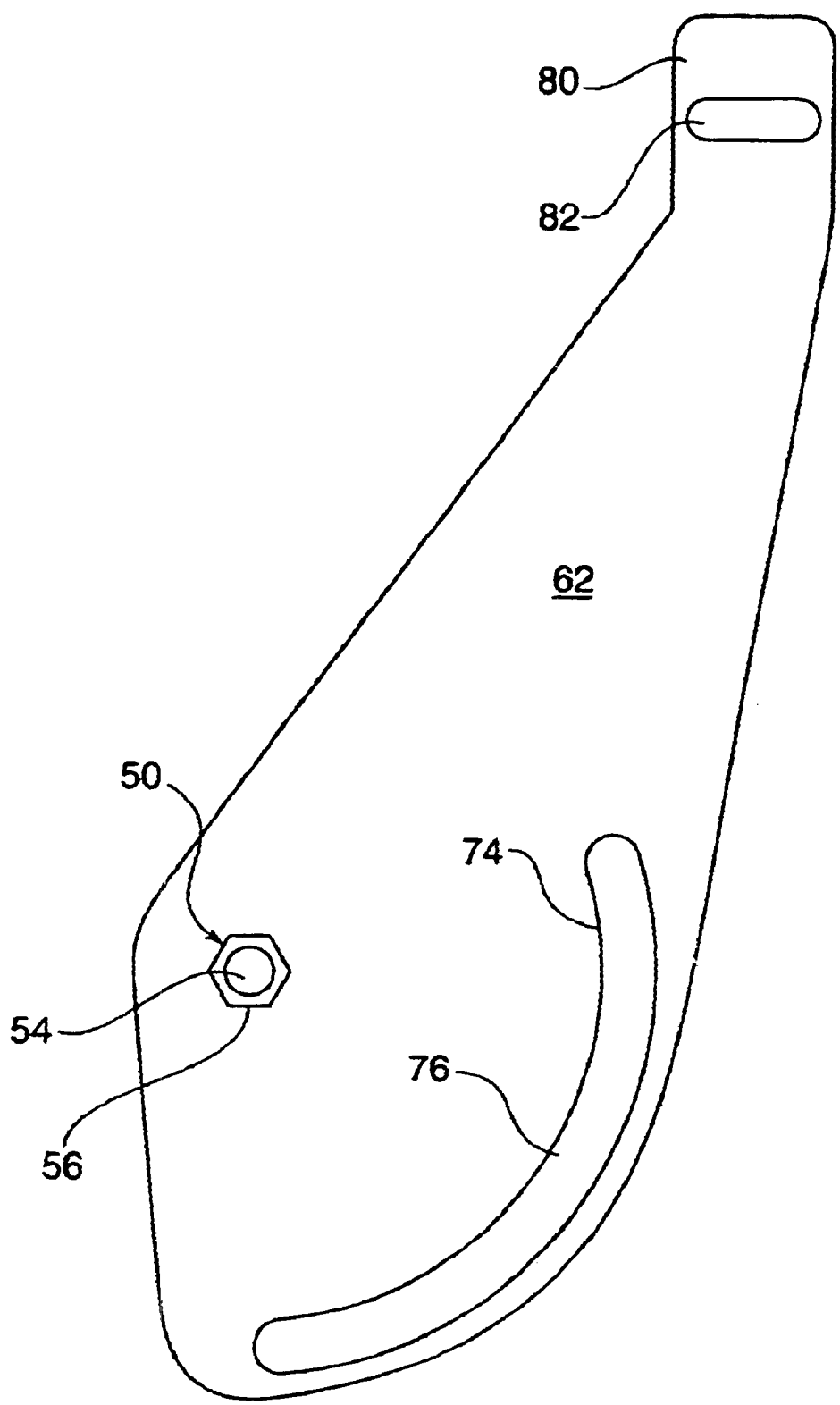
Figure 6:
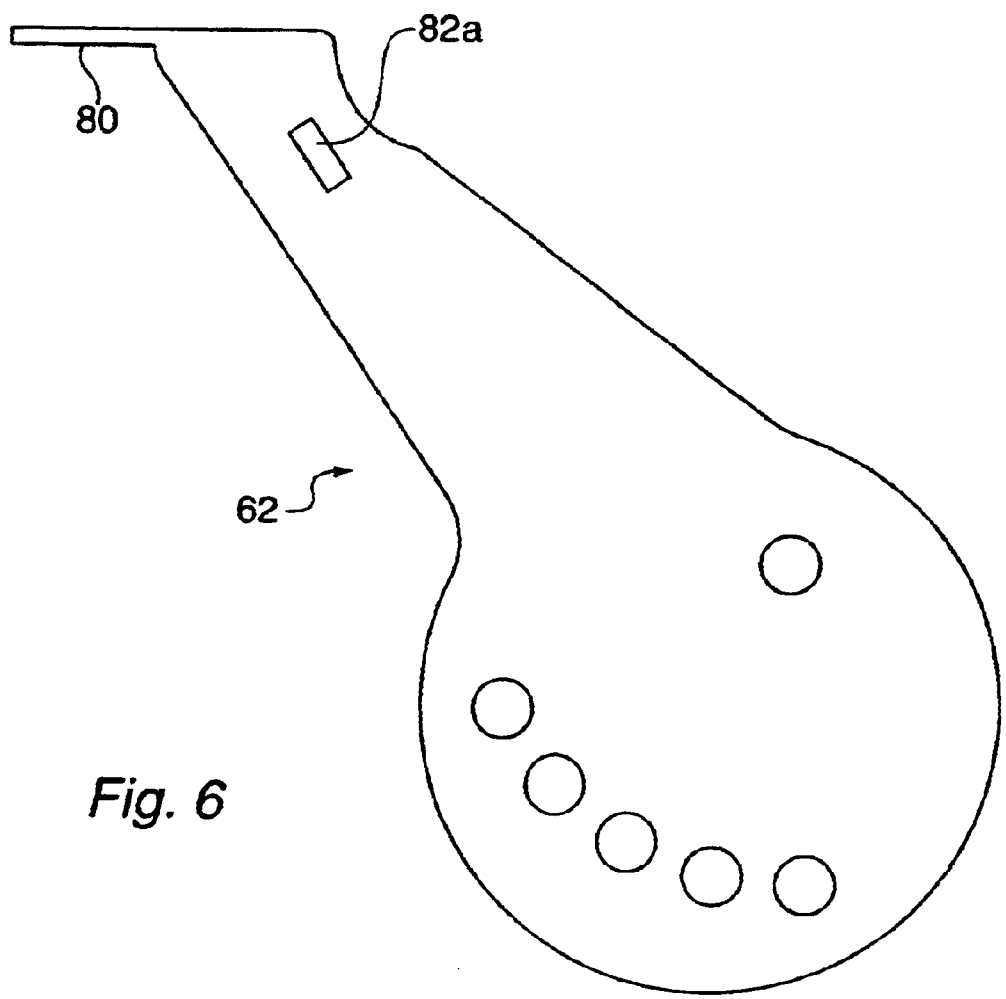
Figure 7:
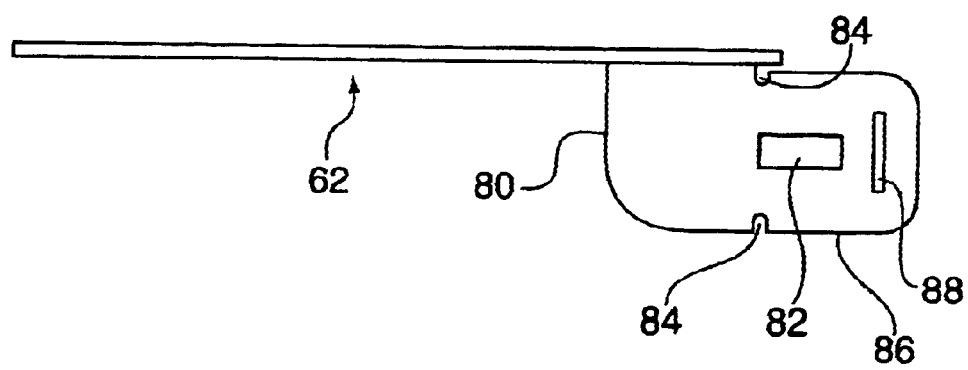
Figure 8:
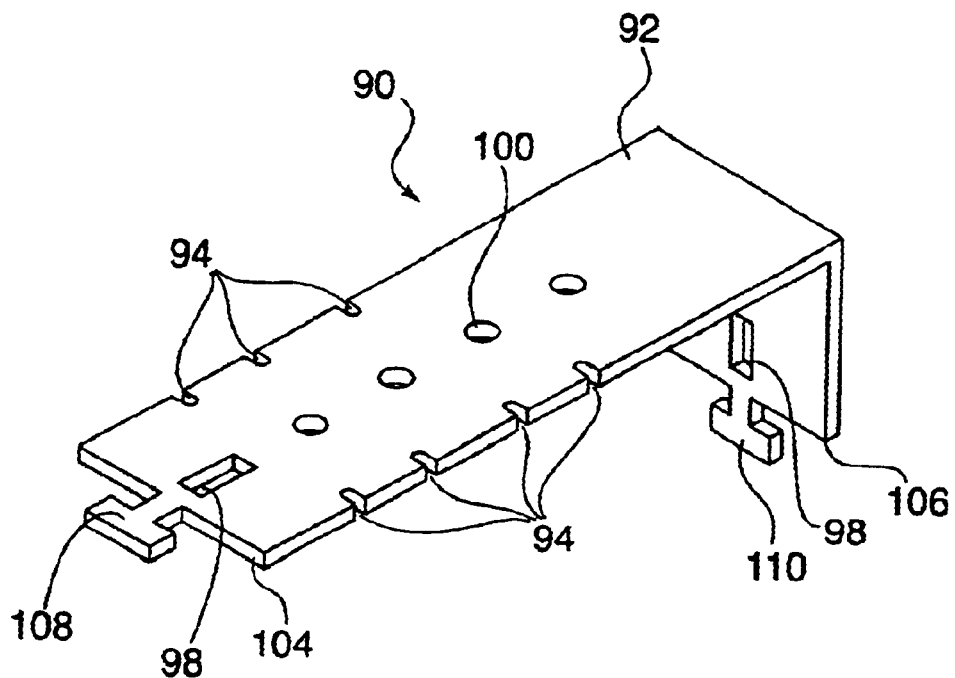
Figure 9:
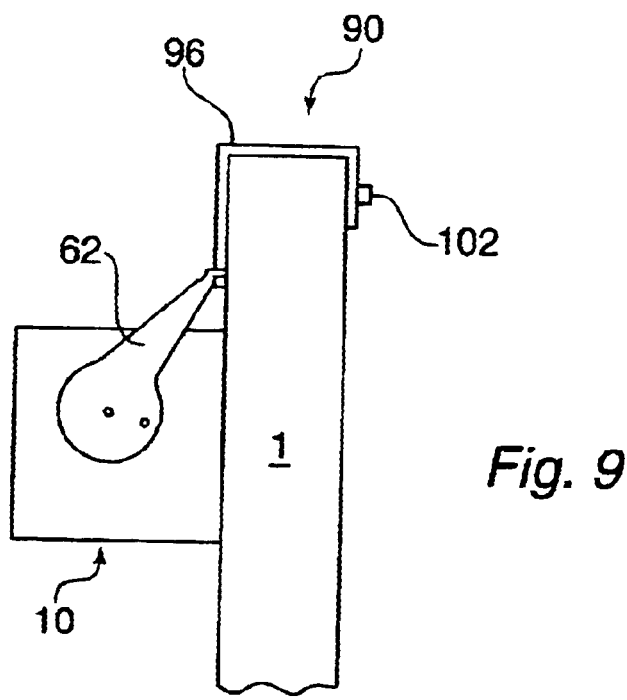

FIG. 1 a perspective view of an embodiment of a planter,

FIG. 2 planter of FIG. 1 in longitudinal section,

FIG. 3 a detail view of a planter in longitudinal section,

FIG. 4 a first embodiment of a retaining arm of the planter according to the invention, from the side, FIG. 5 a second embodiment of a retaining arm of the planter according to the invention, from the side, FIG. 6 a third embodiment of a retaining arm of the planter according to the invention, from the side, FIG. 7 the retaining arm of FIG. 6, from above, FIG. 8 a support bracket of the planter in perspective view, FIG. 9 an embodiment of the planter secured to a wall, from the side.

FIG. 1 illustrates an embodiment of a planter 10 in perspective view. This consists of a plant container 12 with bottom 14, not shown in FIG. 1, having front and rear sidewalls 16, 18, wherein these sidewalls 16, 18 are connected by shorter sidewalls 20, 22. An insert in the form of a basket 30 is inserted into plant container 12.

Basket 30 is furnished with a bottom 32 with apertures 34 and sidewalls 36–42. FIG. 2 shows that bottom 32 having aperture 34 is disposed with separation from bottom 14 of planter container 12, thereby creating a chamber 55 for the storage of water.

In contrast thereto, sidewalls 36–42 of basket 30 are in relatively close proximity to sidewalls 16–22 of planter 10. Sidewalls 20, 22 of plant container 12 are furnished with bolts 50, 52, which serve for attachment of support 60.

This support 60 is described in detail with reference to FIGS. 2–5.

In FIG. 2, planter 10 of FIG. 1 is shown in longitudinal section; the illustration in FIG. 2 also indicates diagrammatically a retaining arm 62. Support 60 is conformed with at least two of these retaining arms 62, which are attached to bolt 50, 52.

A first embodiment of a retaining arm 62 is shown in longitudinal section from the side in FIGS. 3 and 4. One end 64 of retaining arm 62 provides a means for for fastening to planter 10, and the other end 66 for fastening to an attachment location, not shown explicitly in the drawing. For this purpose, the retaining arm 62 is brought into contact with one of the inner walls 24, 26 of sidewall 20, 22 of planter 12, and bolts 50, 52 are introduced through holes 72 and 74.

So that retaining arm 62 may be attached, it is simply placed over bolts 50; basket 30 is then inserted into plant container 12, such that outer wall 44, 46 of sidewall 40, 42 of basket 30 prevents lateral displacement of retaining arm 62.

An upper area 70 of retaining arm 62 is furnished with a fastening flange 80 for attachment to the attachment location, and the attachment flange 80 illustrated in FIGS. 3 and 4 has an elongated hole 82, through which attachment means can be guided. This is indicated in exemplary manner by stud 84 in FIG. 3.

In the embodiment illustrated in FIG. 4, a plurality of holes 74, 74a–74d is arranged in an arc pattern. These holes 74, 74a–74d allow the angle between retaining arm 62 and plant container 12, or between the retaining arm and the attachment location, to be adjusted in accordance with the surrounding conditions. For this purpose, hole 72 in retaining arm 62 is pushed over bolt 50 illustrated on the left in FIG. 4, and twisted over bolt 50 in such manner that bolt 50 as shown on the right in FIG. 4 engages in the desired hole 74, 74a–74d. According to FIGS. 3 and 4 bolts 50, 52 are made from plastic and are injected into sidewalls 20, 22 of planter 12 as single-piece components. However, other types of bolt 50, 52 can also be used, for example it is possible to conform bolts 50, 52 with one or more tongues on sidewalls 20, 22 of plant container 12, or studs, snaps or similar may be used.

In FIG. 5, a second embodiment of a retaining arm 62 is shown. This retaining arm shown in FIG. 5 differs from the retaining arm 62 in FIGS. 3 and 4 in that this time hole 74 is conformed as a curved elongated hole 76. This elongated hole 76 provides infinite adjustability of the angle of retaining arm 62, yet retaining arm 62 can still be attached to plant container 12 using a conventional stud 54 with nut 56. A second stud 54 with nut 56 can likewise be introduced through hole 72, hole 72 not being shown in FIG. 5.

The retaining arm 62 illustrated in FIG. 5 is also furnished with a fastening flange 80 with elongated hole 82, wherein fastening flange 80 of retaining arm 62 in FIG. 5 is not angled.

The retaining arms 62 illustrated in FIGS. 2–5 are flat members made from V2A steel, however other materials can also be used. Even a plastic coating in a color consistent with that of the planter 10 is conceivable.

A third embodiment of a retaining arm 62 is illustrated from the side and from above in FIGS. 6 and 7.

The retaining arm 62 shown in FIGS. 6 and 7 is largely similar to retaining arm 62 illustrated in FIG. 4; similarly thereto, the retaining arm 62 of FIGS. 6 and 7 also has an angled fastening flange 80 having an elongated hole 82. In addition, the fastening flange of FIGS. 6 and 7 is furnished with a folding point 84, by means of which a smaller front surface 86 of fastening flange 80 can be bent at right angles to fastening flange 80. This smaller front surface 86 of fastening flange 80 is further provided with a slot 88 which serves to provide attachment for a conventional band clamp—not shown—or other metal clip, wherein the band clamp or metal clip may be attached, for example, to a balcony railing head having a rounded profile.

The retaining arm 62 in FIG. 6 is furnished with an additional elongated hole 82a, which serves to receive or secure hooks, chains, cords or perforated straps when the planter 10 is suspended vertically, or through which retaining arm 62 can be screwed directly to a wall or similar.

The elongated hole 82 in fastening flange 80 of retaining arm 62 as shown in FIGS. 6 and 7 can be used for attaching a support bracket 90 shown in FIG. 8. This support bracket 90 is an angle member 92, which can be bent at folding points 94 to form a U-member 96. Angle member 92 may be bent at folding points 94 to create an angle corresponding to the depth of the attachment location, indicated in FIG. 9 by wall 1, and serve as a bracket for attaching to the attachment location.

The angle member illustrated in FIG. 8 is furnished with two elongated holes 98 and drillholes 100, which serve for securing angle member 92 to the attachment location. As is shown for exemplary purposes in FIG. 9, e.g. a screw 102 can be passed through elongated hole 98 and secured to wall 1.

Angle member 92 is furnished at either end 104, 106 with toggles 108, 110 that can be inserted through elongated hole 82 in fastening flange 80 on retaining arm 62 as shown in FIGS. 6 and 7, and twisted. Toggles 108, 110 can also be used to attach a perforated strap or similar thereto. This may be advantageous when, for example, a support bracket 90 is positioned on top of a balcony railing head and it is not possible to screw the support bracket to the railing head. The, toggles 108, 110 may be attached to a perforated strap or similar, such that the entire assembly completely surrounds the railing head.

What is claimed is:

1. A planter (10) comprising a plant container (12) which opens upward and which has a bottom (14) and sidewalls (16–22), an insert for insertion into the plant container (12), wherein the insert is comprised of a basket (30) which opens upward and which is provided for accommodating a plant culture, whereby the basket (30) has a bottom (32) and sidewalls (36–42), and wherein the planter (10) comprises a support (60) which can be attached with an end (64) thereof to the planter (10) and can be attached with another end (66) thereof to a fastening location, characterized in that the support (60) consists of two retaining arms (62) which can be attached to two opposing sidewalls (20, 22) of the planter (10), whereby each retaining arm (62) can be fixed with a lower area (68) thereof to an inner wall (24; 26) of a sidewall (20; 22), wherein the lower area (68) of the retaining arm (62) is provided with at least two holes (72, 74; 76) in which bolts (50; 52) mounted on the inner wall (24; 26) engage, whereby, when engaged, the retaining arm (62) is laterally fixed to the bolts (50; 52) through the inner wall (24, 26) of the sidewall (20, 22) of the plant container (12) and through an outer wall (44; 46) of a sidewall (40, 42) of the basket (30), and that an upper area (70) of the retaining arm (62) rises above the plant container (12) and the basket (30) is provided with a fastening flange (80) for fixing to the fastening location, wherein an angle between the fastening flange (80) and the fastening location can be adjusted when the planter (10) is in a horizontal position.

2. The planter according to claim 1, characterized in that both bolts (50; 52) are arranged on the sidewall (20; 22) of plant container (12) on a line parallel to the surface of the bottom wall (32) of the basket (30).

3. The planter according to claim 1, characterized in that a plurality of holes (74, 74a–74d) are arranged in an arc pattern with respect to each other in a lower area (68) of retaining arm (62), wherein one bolt (50) can be engaged with any hole (74, 74a–74d) in the arc, whereas a second bolt (50) can be engaged in a hole (72) that is located outside of the arc, whereby the linear separation between each hole (74, 74a–74d) of the arc and the hole (72) located outside the arc is the same in every case.

4. The planter according to claim 1, characterized in that the retaining arm (62) is a flat member, in which an upper end forming the fastening flange (80) is conformed angularly.

5. The planter according to claim 4, characterized in that the fastening flange (80) is furnished with at least one folding point (84) for further angular conformation of at least one smaller area (86) of fastening flange (80).

6. The planter according to claim 4, characterized in that the fastening flange (80) is furnished with an elongated hole (82).

7. The planter according to claim 4, characterized in that the fastening flange (80) is furnished with a slot (88).

8. The planter according to claim 1, characterized in that the bolt (50; 52) is a single-piece ratchet that is attached to the inner wall (20; 22) of the plant container (12) by means of a sprung tongue.

9. The planter according to claim 1, characterized in that the bolt (50; 52) is made from plastic and is injected into the inner wall (20; 22).

10. The planter according to claim 1, characterized in that the bolt (50; 52) is springily located in the sidewall (20; 22).

11. The planter according to claim 1, characterized in that the bolt (50; 52) is a stud (54).

12. The planter according to claim 1, characterized in that a hole (74) in the retaining arm (62) is a curved elongated hole (76).

13. The planter according to claim 1, characterized in that the retaining arm (62) is attachable to a support bracket (90).

14. The planter according to claim 3, characterized in that the support bracket (90) is an angle member (92) that can be angled to create a U-member (96).

15. The planter according to claim 4, characterized in that the angle member (92) is furnished with at least one folding point (94), by means of which the angle member (92) can be angled to create a U-member (96).

16. The planter according to claim 4, characterized in that the angle member (92) is furnished on at least one end (104; 106) with a toggle (108; 110) wherein the toggle (108; 110) can be attached to the fastening flange (80).

* * * * *